April 10, 1951     W. H. RICHARDS     2,547,974
QUICK EMPTYING, MOVABLY MOUNTED, SPRING-LOADED
SUPPLY CONTAINER
Filed Feb. 5, 1947

INVENTOR.
WILLIAM H. RICHARDS
BY Wade Koonitz AND
Chester Tietig
ATTORNEYS

UNITED STATES PATENT OFFICE 2,547,974

QUICK EMPTYING, MOVABLY MOUNTED, SPRING-LOADED SUPPLY CONTAINER

William H. Richards, Dayton, Ohio

Application February 5, 1947, Serial No. 726,506

1 Claim. (Cl. 222—162)

(Granted under the act of March 3, 1883, as amended April 30, 1928; 370 O. G. 757)

The invention described herein may be manufactured and used by or for the Government for governmental purposes without payment to me of any royalty thereon.

The invention relates to a quick emptying, movably mounted, spring-loaded supply container. While it may be applied to any purpose for which quick-emptying tanks are desirable, it is especially adapted to use in photography as a developing tank. The invention will be described in relation to such use.

The principal object is to provide a tank which may be emptied at a faster rate, without inverting it, than tanks now in use.

Another object is to provide a tank which needs only an upward pull to initiate the emptying action.

Another object is to provide a tank of the aforesaid characteristics which will not retain residual liquid and which will be positive in its opening and shutting actions.

Another object is to provide a tank which, in large sizes, can readily be emptied with the aid of an overhead crane.

Figure 1:
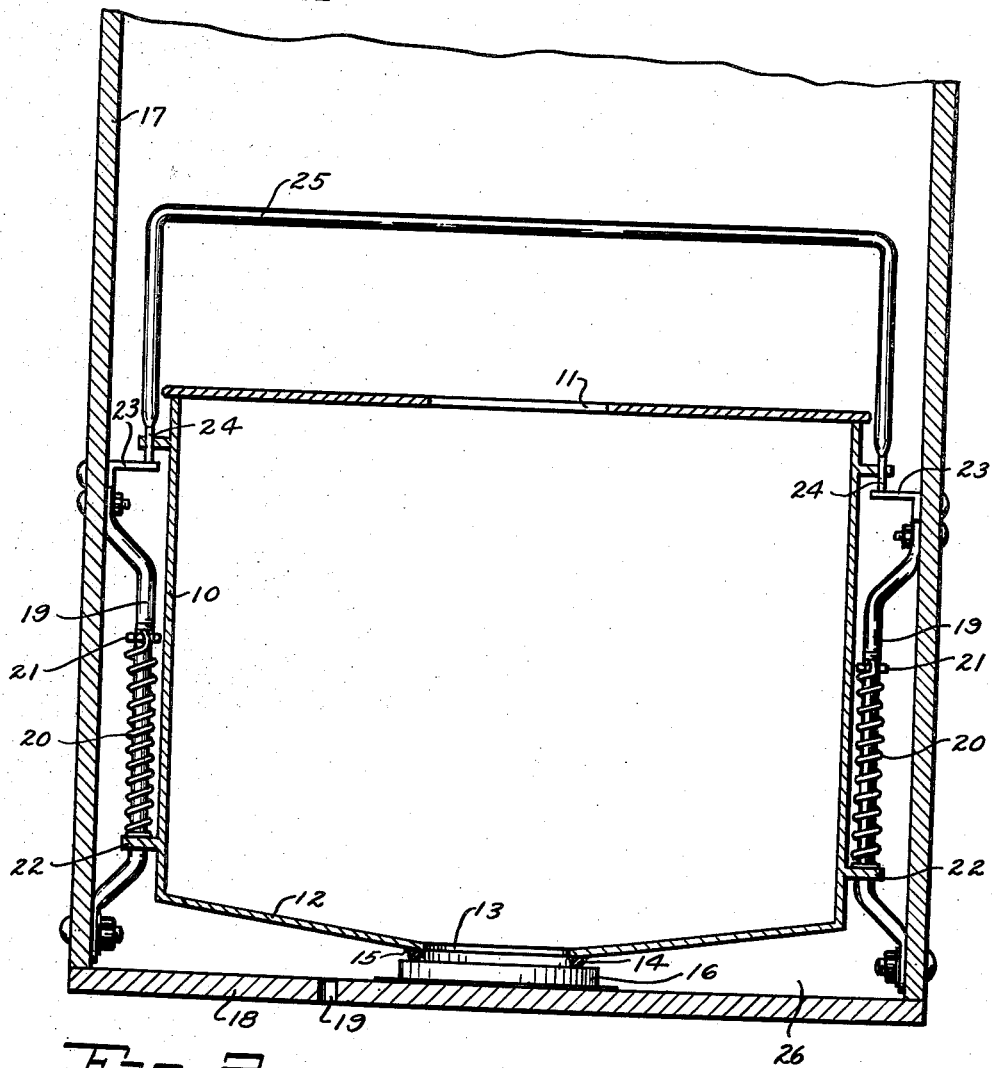
Fig. 1 is a vertical section of a tank according to my invention.

10 is the tank, proper, which may or may not be provided with a freely vented lid 11. The floor 12 has preferably an easy frusto-conical slope to a round or other shaped orifice 13. Around the outer edge of the orifice 13, there is a gasket 14, preferably round and circular in cross section. It is preferably retained in a spring channel 15 which is attached to the tank 10 by welding or the like. The tank rests on the gasket and the latter rests on a low sealing block 16 which has a shouldered shape conforming preferably to the shape of the orifice 13, the base below the shoulder being somewhat larger.

Surrounding the tank 10 is a framework 17 which may itself be in the shape of a tank. The block 16 rests on the bottom 18 of the framework 17. One or more holes 19 are provided in the bottom 18 in order to allow liquid emptied from the tank 10 to flow out of the framework 17. Attached to the framework on the inner surface thereof are a pair of rods or rails 19 which are offset to such a shape that their side view is that of a low flat trapezoid. Wound about each of the rods 19 on the straight portion thereof is a coil spring 20. The spring 20 is held between upper stop nuts and lower lugs, respectively 21 and 22. Lugs 22 are attached to the side walls of the tank 10 and also encircle the bars 19. Nuts 21 are free from the tank but are adjustably attached to a point on the rods 19.

Above each rod 19 is mounted a right angled lug 23 upon which may rest a hinge 24 for a bail 25, which latter serves as a handle whereby the tank 10 may be lifted off block 16. Lugs 23 are not essential elements but are preferred so that part of the weight of the tank 10 and contents is supported upon them and part on the gasket 14. Lugs 23 prevent too speedy a loss of resilience of the gasket 14 from overcompression and also frictionally support the bail in an upright position as shown in Fig. 1.

Assuming that the tank is full of liquid, an upward pull is given on bail 25, either by hand or by crane, to empty the tank. The latter is lifted off block 16 and the liquid runs out the orifice 13 from between the gasket 14 and the block 16 into the space 26 between the tank 10 and framework 17. It then runs out of the latter through opening 19. During the lifting of tank 10, spring 20 has been compressed between upwardly moving lugs 22 and nuts 21. Upon lowering the emptied tank, the spring 20 exerts downward pressure on gasket 14, thereby providing a non-leaking fit of the tank 10 on block 16. This fit is rendered tighter by the weight of liquid when the tank 10 is filled. The gasket 14 may be compressed until the hinges 24 rest fully on the lugs 23. It will be seen therefore that a heavy discharge of liquid from the tank 10 can be accomplished in a very short time.

Figure 2:
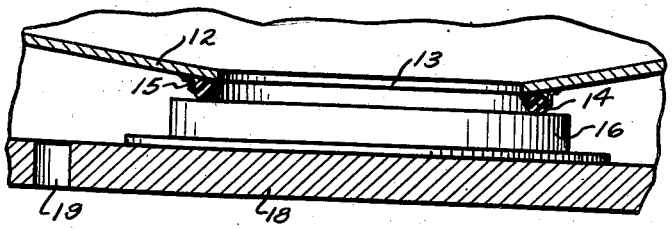
Fig. 2 is an enlarged detail of the discharge orifice and is also a vertical section.

By a modification of the invention, for use when the tank is to be lifted manually, the coil springs 20 are in tension instead of compression when the tank is in the position shown in Figs. 1 and 2. In such case the retractive force of the springs 20 assists the manual effort required to lift the tank to empty it. The lifting force of the springs 20 may be adjusted by turning the stops 21 which for this purpose may be threaded as stop nuts on the rods 19. The degree of adjustment is preferably that which just counterbalances the weight of the tank when empty.

When photographic film or plates are being developed in the tank 10, it is possible to arrest the developing process quickly by emptying the tank of developer solution. This solution can be saved by placing a container for it under opening 19. The ability to quickly arrest development of many large-sized films or plates simultaneously is of great value in photography, especially where mass production in short periods of time is the goal. It is also evident that a photographic process has been disclosed, i. e., in development, the steps of moving the developer solution quickly away from the material to be developed, instead of the conventional method of moving the films or plates out of the developer bath.

The invention claimed is:

A quick-emptying tank which comprises an outer framework, a tank within said framework, said tank having a discharge orifice in its bottom, a shouldered block between said framework and said orifice, a gasket closely abutting said block about the shoulder thereof whereby to seal the orifice, offset rods mounted on opposite sides of said framework between said framework and said tank, a lug on each side of said tank substantially encircling one of said rods, a coil spring encircling each of said rods above said lug, an adjustable stop nut threadedly engaging each of said rods above said coil spring, the upper end of each of said coil springs being attached to one of said stop nuts, a bail for said tank, hinges for said bail, an inwardly-projecting lug at the top of each rod, said hinges making contact with the top surfaces of said inwardly projecting lugs whereby to assist in preventing said gasket from becoming over-compressed by the weight of the tank.

WILLIAM H. RICHARDS.

REFERENCES CITED

The following references are of record in the file of this patent:

UNITED STATES PATENTS

| Number | Name | Date |
|---|---|---|
| 578,954 | Case | Apr. 6, 1897 |
| 835,988 | Swartz | Nov. 13, 1906 |
| 1,226,803 | Osborn | May 22, 1917 |
| 1,544,445 | Gilmore | June 30, 1925 |
| 1,595,792 | Leiman | Aug. 10, 1926 |
| 1,632,473 | Greenland | June 14, 1927 |
| 2,166,484 | Carlson | July 18, 1939 |
| 2,249,791 | Simon | July 22, 1941 |
| 2,284,236 | Smith | May 26, 1942 |
| 2,317,591 | Cramwinckel | Apr. 27, 1943 |